2,791,607

PREPARATION OF DICARBOXYLIC ACIDS

John L. Ohlson, Chicago, and Kurt H. Spitzmueller, Clarendon Hills, Ill., assignors to Swift & Company, Chicago, Ill., a corporation of Illinois No Drawing. Application January 10, 1955, Serial No. 481,002

9 Claims. (Cl. 260—537)

The present invention relates to the preparation of dicarboxylic acids. More specifically, the invention is directed to the preparation of dicarboxylic aliphatic acids from the fusion of chlorohydroxy substituted monocarboxylic aliphatic acids or derivatives thereof with an alkali metal hydroxide.

In the preparation of dicarboxylic aliphatic acids, it has been found that the fusion reaction between the aliphatic acid or derivative thereof having chlorine atoms paired with hydroxyl groups on adjacent carbon atoms and an alkali metal hydroxide provides a relatively high yield of dicarboxylic aliphatic acids in the reaction mixture. This method of preparing dicarboxylic aliphatic acids has particular application in connection with the fusion of chlorohydroxy substituted monocarboxylic aliphatic acids with an alkali metal hydroxide. The following detailed description of the method of the present invention refers in particular to the use of chlorohydroxy substituted monocarboxylic fatty acids, but it should be understood that, by referring to the derivatives of such compounds, it is intended to include those compounds of aliphatic origin either in the form of acids, esters, amides, etc., having at least one chlorine atom paired with at least one hydroxyl group on adjacent carbon atoms and capable of scission to form a dicarboxylic aliphatic acid.

The method of the present invention has been found to be particularly applicable to the use of a chlorohydroxy fatty acid as one of the reactants. Of this group, chlorohydroxy stearic acid has particular application as a reactant in a fusion reaction with sodium hydroxide. 9(10) chloro 10(9) hydroxy stearic acid can be prepared by the controlled addition of aqueous hypochlorous acid to oleic acid. This method of preparation is well known and commonly practiced.

1. Albitzky, J. Prakt. Chem., 1900, 61, 65
2. Nicolet & Poulter, J. A. C. S., 52, 1186, (1930)
3. Atherton & Hilditch, J. C. S. 1943, 204
4. Swern, J. A. C. S., 70, 1235, (1948)
5. Naudet, Bull. Soc. Chim. France, 1950, 842

The dry chlorohydroxy monocarboxylic fatty acid, such as 9(10) chloro 10(9) hydroxy stearic acid, is reacted with an alkali metal hydroxide, such as sodium hydroxide, at a temperature within the approximate range of 340° to 400° C. The length of time necessary to complete such a reaction will vary from 10 to 30 minutes depending upon the temperature utilized. For example, it has been found that at temperatures of approximately 340° C., the maximum time of fusion should not exceed 30 minutes, whereas at the higher temperatures of approximately 400° C., 10 minutes is the maximum time of fusion. The resultant reaction mass is cooled and dissolved in water. In order to recover the dicarboxylic acid formed, the mixture is neutralized or acidified to only a slight degree. For example, acidification to a pH of 6 enables the removal of any tars which are normally insoluble at this pH. Following the removal of tars by filtering or any other suitable means, when such removal is considered desirable, the pH of the aqueous solution is reduced to a pH of 3 or lower. At such a pH, the dicarboxylic acids are liberated from their salts. The dicarboxylic acid can be removed from solution by suitable cooling and/or concentrating to allow crystallization of the product, followed by isolation of the crystals formed.

The following examples are illustrative of the method of the present invention and should not be considered as limiting thereto.

*Example I*

Forty grams of solid sodium hydroxide were heated in a metal bath with stirring to approximately 375° C. Twenty grams of 9(10) chloro 10(9) hydroxy stearic acid were added in several portions over a five minute period while the temperature was maintained relatively constant. The mix was maintained under the aforementioned temperature conditions for approximately 2 minutes and then cooled. The mix was then dissolved in water and the resultant aqueous mixture was acidified with dilute hydrochloric acid to a pH of 3. The acidified mix was then steam distilled to remove short chain carboxylic acids and other volatile contaminants. The hot residue was extracted 3 times with hot water and the extracts were cooled. Upon cooling, the solution yielded 2.8 grams of azelaic acid by crystallization.

*Example II*

Forty grams of solid sodium hydroxide were fused under a nitrogen gas blanket at approximately 373° C. 20.7 grams of 9(10) chloro 10(9) hydroxy stearic acid were introduced into the molten sodium hydroxide in a thin stream with stirring. The reaction mass was maintained at a temperature between 373° C. to 380° C. for 3 to 5 minutes. During this time, the nitrogen atmosphere was maintained. Upon completion of the reaction, the mass was cooled under nitrogen and mixed with water. The aqueous mixture was adjusted to a pH of 6. This adjustment of the pH converted the dicarboxylic acids into the form of monosodium salts which are soluble at this particular concentration. The black, insoluble oily tars present in the mixture were removed by filtering and the remaining straw-colored liquid was further acidified to a pH of between 2 and 3 with hydrochloric acid. The solution was cooled over night and 3.8 grams of azelaic acid were obtained therefrom by crystallization. The initial 3.8 grams of acid were found to be 71.6% pure. Further cooling and concentration yielded 5 grams of product assaying 6.4% azelaic acid.

As can be seen from the above examples, different methods of recovering the dicarboxylic acids formed may be used. The particular recovery method relied upon will depend upon the type of by-products present in the mix. Normally, it has been found that the best recovery method involves dissolving the dicarboxylic acid salts in water. By suitable adjustment of pH and temperature, the acids can be recovered in their crystalline form.

Obviously, many modifications and variations of the invention as hereinbefore set forth may be made without departing from the spirit and scope thereof, and therefore only such limitations should be imposed as are indicated in the appended claims.

We claim:

1. A method of preparing dicarboxylic aliphatic acids which comprises: reacting a member from the group consisting of chlorohydroxy substituted monocarboxylic aliphatic acids having from 10 to 24 carbon atoms and functional derivatives of the carboxyl groups thereof with an alkali metal hydroxide at an elevated temperature; and thereafter, separating the dicarboxylic acid from the reaction products formed.

2. A method of preparing dicarboxylic aliphatic acids which comprises: reacting a member from the group consisting of chlorohydroxy substituted monocarboxylic aliphatic acids having from 10 to 24 carbon atoms and functional derivatives of the carboxyl groups thereof with an alkali metal hydroxide at temperatures within the approximate range of 340° to 400° C.; and thereafter, separating the dicarboxylic acid from the reaction products formed.

3. A method of preparing dicarboxylic aliphatic acids which comprises: reacting a member from the group consisting of chlorohydroxy substituted monocarboxylic aliphatic acids having from 10 to 24 carbon atoms and functional derivatives of the carboxyl groups thereof with an alkali metal hydroxide at temperatures within the approximate range of 340° to 400° C. for a period of time ranging from no longer than 30 minutes at the lowest temperatures and no longer than 10 minutes at the highest temperatures; and thereafter, separating the dicarboxylic acid from the reaction products formed.

4. A method of preparing dicarboxylic aliphatic acids which comprises: reacting a member from the group consisting of chlorohydroxy substituted monocarboxylic aliphatic acids having from 10 to 24 carbon atoms and functional derivatives of the carboxyl groups thereof with an alkali metal hydroxide at temperatures within the approximate range of 340° to 400° C.; acidifying the resultant reaction mixture; and thereafter, crystallizing out the dicarboxylic acid formed.

5. A method of preparing dicarboxylic aliphatic acids which comprises: reacting a member from the group consisting of chlorohydroxy substituted monocarboxylic aliphatic acids having from 10 to 24 carbon atoms and functional derivatives of the carboxyl groups thereof with an alkali metal hydroxide at temperatures within the approximate range of 340° to 400° C.; adding water to the cooled reaction mixture; acidifying the resultant aqueous mixture; removing from said aqueous mixture the undissolved portion thereof; and thereafter crystallizing dicarboxylic acid from the remaining aqueous solution.

6. A method of preparing azelaic acid which comprises: fusing 9(10) chloro 10(9) hydroxy stearic acid with sodium hydroxide at a temperature within the approximate range of 340° to 400° C.; and thereafter separating the azelaic acid from the reaction mixture so formed.

7. A method of preparing azelaic acid which comprises: fusing 9(10) chloro 10(9) hydroxy stearic acid with sodium hydroxide at a temperature within the approximate range of 340° to 400° C. for a period of time ranging from no longer than 30 minutes at the lowest temperatures and no longer than 10 minutes at the highest temperatures; acidifying the resultant reaction mixture; and thereafter crystallizing out the azelaic acid formed.

8. A method of preparing azelaic acid which comprises: fusing 9(10) chloro 10(9) hydroxy stearic acid with sodium hydroxide at a temperature within the approximate range of 340° to 400° C.; cooling the reaction mass; forming an aqueous mixture of the reaction mass; acidifying the aqueous mixture to a relatively low pH; removing short chain carboxylic acids from said mixture by distillation; further purifying said mixture by extraction; and thereafter removing azelaic acid therefrom upon cooling.

9. A method of preparing azelaic acid which comprises: fusing 9(10) chloro 10(9) hydroxy stearic acid with sodium hydroxide at a temperature within the approximate range of 340° to 400° C. while maintaining said reactants in an inert atmosphere; cooling the reaction mass while maintaining said inert atmosphere; forming an aqueous mixture of the reaction mass; adjusting the pH of said aqueous mixture to slight acidity; filtering said aqueous mixture; adjusting the pH of the resultant filtrate to a relatively high acidity; and thereafter removing crystallized azelaic acid therefrom.

References Cited in the file of this patent

UNITED STATES PATENTS 2,614,122　　Mikeska　＿＿＿＿＿＿＿＿＿＿＿＿＿＿　Oct. 14, 1952

OTHER REFERENCES

Wagner-Zook: "Synthetic Organic Chemistry," 1953; pg. 423.